United States Patent [19]
Xu et al.

[11] Patent Number: 5,555,471
[45] Date of Patent: Sep. 10, 1996

[54] METHOD FOR MEASURING THIN-FILM THICKNESS AND STEP HEIGHT ON THE SURFACE OF THIN-FILM/SUBSTRATE TEST SAMPLES BY PHASE-SHIFTING INTERFEROMETRY

[75] Inventors: Yiping Xu; Yuan J. Li, both of Tucson, Ariz.

[73] Assignee: Wyko Corporation, Tucson, Ariz.

[21] Appl. No.: 449,353

[22] Filed: May 24, 1995

[51] Int. Cl.$^6$ ............................................. G01B 9/02
[52] U.S. Cl. ............................................. 356/357; 356/359
[58] Field of Search ............................................. 356/355, 357, 356/359, 360, 381, 382

[56] References Cited

U.S. PATENT DOCUMENTS

| | | | |
|---|---|---|---|
| 4,832,489 | 5/1989 | Wyant et al. | 356/359 |
| 4,844,616 | 7/1989 | Kulkarni et al. | 356/359 |
| 5,042,949 | 8/1991 | Greenberg et al. | 356/359 |
| 5,129,724 | 7/1992 | Brophy et al. | 356/357 |
| 5,173,746 | 12/1992 | Brophy | 356/357 |

*Primary Examiner*—Samuel A. Turner
*Attorney, Agent, or Firm*—Antonio R. Durando

[57] ABSTRACT

The film thickness and surface profile of a test sample consisting of optically dissimilar regions are measured by phase-shifting interferometry. Conventional phase-shifting interferometry at a given wavelength is performed to measure the step height between two regions of the surface. The theoretical measured step height as a function of the film thickness is then calculated. A set of possible solutions corresponding to the experimentally measured-height are found numerically or graphically by searching the theoretically generated function at the measured height. If more than one solution exists, the phase-shifting procedure is repeated at a different wavelength and a new theoretical measured-height as a function of the film thickness is calculated for the optical parameters of the materials at the new wavelength, yielding another set of possible solutions that correspond to the newly measured height. The number of repetitions of the procedure depends on the number of unknowns of the test sample. The film thicknesses are obtained by comparing all possible solution sets and finding the single combination of thicknesses corresponding to the experimentally measured heights at different measurement wavelengths. The same method may also be used for reconstructing a 3-dimensional profile of the patterned film surface by measuring the film thickness variation point by point across the entire measurement field.

12 Claims, 9 Drawing Sheets

METHOD FOR MEASURING THIN-FILM THICKNESS AND STEP HEIGHT ON THE SURFACE OF THIN-FILM/SUBSTRATE TEST SAMPLES BY PHASE-SHIFTING INTERFEROMETRY

BACKGROUND OF THE INVENTION

1. Field of the Invention

This invention pertains in general to the field of phase-shifting interferometry and, in particular, to a novel approach for measuring thin-film thickness and step heights between regions of a surface having different phase change on reflection.

2. Description of the Related Art

Optical surface profilers based on phase-shifting interferometry (PSI) utilize phase measurements to calculate the surface height values, $h(x,y)$, at each point of a surface under test. The technique is founded on the concept of varying the phase difference between two coherent interfering beams of single wavelength in some known manner, such as by changing the optical path difference (OPD) in discrete steps or linearly with time. Under such conditions, three or more measurements of the light intensity at a pixel of a receiving sensor array can be used to determine the initial phase difference of the light beams at the point on the test surface corresponding to that pixel. Based on such measurements at each pixel of coordinates x and y, a phase distribution map $\Phi(x,y)$ can be determined for the test surface, from which very accurate height data $h(x,y)$ are calculated by the following general equation in relation to the wavelength $\lambda$ of the light source used:

$$h(x,y) = \frac{\lambda}{4\pi} \Phi(x,y). \quad (1)$$

Phase-shifting interferometry provides a vertical resolution on the order of 1/100 of a wavelength or better and is widely used for measuring opaque surfaces of similar materials. However, existing techniques for reconstructing surface profiles from phase measurements are inadequate for samples having optically-thin films over opaque substrates because the phase change associated with the beam reflected from the thin-film surface is distorted by interference between the light reflected from the top and the bottom of the film. An optically-thin film is defined as having a film thickness that is less than the coherence length of the light source, or less than the skin depth of the material, or less than the depth of field of the interferometric microscope. Also, if the substrate material is not optically dielectric (i.e., the extinction coefficient of the material is not zero), a phase change occurs on reflection from the substrate as well (referred to in the art as Fresnel phase change on reflection). In such cases the phase changes on reflection from the film and from the substrate (or from regions of different thin-film thickness) vary with several parameters including the film thickness and the optical constants of the materials composing the film and the substrate. Therefore, unless these parameters are all known, a correct profile measurement of a thin-film/substrate surface is impossible with conventional techniques, which are limited to measurements of homogeneous surfaces.

The relationship between the phase change associated with a beam reflected at the interface between an incident medium (such as air) and a film assembly (film plus substrate) and the physical properties of the media are well understood in the art. For example, referring to the case illustrated in FIG. 1, where an optically-thin film 10 of thickness t (which is also the step height h) is deposited over a portion of an opaque substrate 12, the phase change of a normal incident beam L (shown incident at an angle to illustrate reflection according to acceptable convention) reflected from the substrate 12 can be calculated by the following equation $$\Delta\phi = \arctan\left(\frac{2k_s}{1-n_s^2-k_s^2}\right), \quad (2)$$

where $n_s$ and $k_s$ are the refraction index and the extinction coefficient of the substrate material, respectively. It is known that the substrate parameters $n_s$ and $k_s$ vary with the wavelength $\lambda$ of the incident light; therefore, Equation 2 can be expressed as $\Delta\phi=\Delta\phi(\lambda)$. Accordingly, the phase change $\Delta\phi$ of a normal incident light of wavelength $\lambda$ reflected from the substrate 12 can be calculated exactly if the refraction index and extinction coefficient at that wavelength are know.

Similarly, the phase change associated with the reflection of the same beam L normally incident to the thin film 10 from air can be obtained by the equation $$\Delta\phi = \arctan\left(\frac{-2b\eta_o}{n_o^2-a^2-b^2}\right), \quad (3)$$

where $\eta_o$ is the admittance of air, and a and b are the real and imaginary components, respectively, of the input optical admittance Y of the assembly consisting of the thin film 10 and the substrate 12 (i.e., Y=a+ib). As those skilled in the art readily understand, the admittance Y is a function of the thickness t and the optical constants of the thin film 10 and the optical constants of the substrate 12 through a complex relationship that is omitted here for simplicity. For details, see H. A. Macleod, "Thin-Film Optical Filters," 2nd Edition, McGraw Hill, New York (1989), pp. 34–37. Since the optical constants of the film 10 and substrate 10 also vary with the wavelength $\lambda$ of the incident light L, Equation (3) can be represented by the expression $\Delta\phi=\Delta\phi(\lambda,t)$. Therefore, the phase change $\Delta\phi$ of a normal incident light of wavelength $\lambda$ reflected from the thin film 10 can be calculated exactly from the admittance of the assembly if the thickness t of the film (which is also the height h of the step) and the optical constants of the media at that wavelength are know.

In general, when a surface having a step discontinuity h, such as that provided by the thickness t of film 10 in the model of FIG. 1, is scanned to measure the height h by phase-shifting interferometry with a light beam of wavelength $\lambda$, it is known that the measured height, $h_m$, will differ from the true (physical) height, h, according to the relationship $$h_m(\lambda) = h + \frac{\lambda}{4\pi}(\Delta\phi_1 - \Delta\phi_2) \quad (4)$$

where $\Delta\phi_1$ and $\Delta\phi_2$ represent, respectively, the phase changes on reflection from the interface between air and the first region (i.e., the film in the example of FIG. 1) and air and the second, stepped region (i.e., the substrate). From Equations 2 and 3, it is clear that $\Delta\phi_1=\Delta\phi_1(\lambda,t)$ and $\Delta\phi_2=\Delta\phi_2(\lambda)$ for the model of FIG. 1. Therefore, the relationship between the true and measured step heights for the case where the first region consists of a uniform thin film and the second region consists of an opaque substrate (that is, t=h) becomes $$h_m(\lambda) = h + \frac{\lambda}{4\pi}[\Delta\phi_1(\lambda,h) - \Delta\phi_2(\lambda)]. \quad (5)$$

It is noted that Equation 5 represents an implicit relationship of h as a function of $h_m$. Thus, the equation cannot be solved directly to calculate the true step height h as a function of $h_m$ once a measured height $h_m(\lambda)$ is determined by phase-shifting interferometry at a given wavelength λ. In addition, the functionality changes with the wavelength of the incident light because of the different values assumed by the various optical constants of the materials (n, k, $\eta_o$, Y) as the wavelength varies. Therefore, phase-shifting measurements conducted with two different wavelengths, $\lambda_1$ and $\lambda_2$, on a sample with a physical film of thickness h will produce two different measured heights, $h_{m1}$ and $h_{m2}$, respectively. As detailed below, this invention exploits this property to solve Equation 5 explicitly for h (and therefore t) by a numerical approach.

The terms step height and film thickness are used throughout this disclosure to describe the height difference between adjacent regions of a test surface and the thickness of a thin film overlaying a substrate, respectively. The two are obviously the same and can be used interchangeably in the case of a uniform thin film covering a portion of a substrate, such as seen in FIG. 1, but refer to different physical structures in the case of a non-uniform stepped film, as illustrated in FIG. 2, or a uniform film over a stepped substrate (that is, a substrate containing a riser), as illustrated in FIG. 3. In all cases, however, the above-referenced Equations 2–4 from thin-film theory provide the relationships necessary to investigate the phase changes on reflection and their effect on step height measurements by phase shifting. In addition, the general approach of this invention can be extended to produce accurate surface profiles of thin films irrespective of the particular structure of discontinuities.

Prior art techniques, such as described in U.S. Pat. Nos. 5,129,724 and 5,173,746, utilize the above-described relationships to numerically calculate the true height of a step (or thickness of a thin film) from phase-shifting measurements by iterative procedures that are time consuming and require a substantially accurate initial guess that necessitates additional measurements than required for conventional phase-shifting procedures. In particular, these techniques are only suitable for the case shown in FIG. 1; that is, when the sample consists of two regions, a uniform film and a substrate. Even for this case, the invention only works when the measured step height $h_m$ is a monotonic function of the film thickness t. Otherwise, depending on the initial guess, the procedure may produce a wrong solution. In practice, such monotonic relationship hold true for very few materials. These aspects of these techniques are problematic because range and speed of measurement are critical requirements for commercial instruments used for quality control during production.

The present invention is directed at providing an approach that greatly improves prior-art techniques with respect to these problems by allowing a direct determination of the step height h once phase-shifting measurements are carried out. By eliminating the need for a suitable initial guess, it more reliably provides accurate results. In addition, it is founded on a general approach applicable to reconstruct 3-D profiles of samples consisting of different film and substrate combinations.

BRIEF SUMMARY OF THE INVENTION

One primary goal of this invention is a method for profiling a sample surface containing a thin film discontinuity or thickness variation using conventional phase-shifting interferometric measurements.

Another important objective is a procedure that also yields a measurement of the thin-film thickness or the step height in a film/substrate sample.

Another goal is a procedure that affords the direct measurement of the thin-film thickness or the step height in a film/substrate sample by means of an explicit methodology.

Finally, another objective is a method that is suitable for direct incorporation with the hardware of existing interferometric surface profilers.

Therefore, according to these and other objectives, the present invention consists of first performing conventional phase-shifting interferometry at a given wavelength to measure the step height between adjacent regions on the surface of a sample, such as the thickness of a thin film on a substrate. Using known thin-film theory equations, the theoretical relationship between the measured step height and the true step height is determined on the basis of the film thickness and the optical parameters of the materials of the sample at that wavelength. The resulting curve maps all the possible true-height solutions that correspond to the measured height. The phase-shifting procedure is then repeated at a different wavelength and a new theoretical curve of measured step height versus true step height is calculated for the optical parameters of the materials at the new wavelength, thereby deriving another curve of all possible solutions that correspond to the newly measured height. The two curves are then overlapped, graphically or numerically, to find the single true height in both curves that corresponds to the pair of measured heights. The value so determined is the true height of the step between the regions of the sample. Substantially the same procedure can also be applied to find the step height between non-uniform film regions and the step height between a film region and a substrate region containing a riser. Similarly, the invention can be used to produce the surface profile of a sample.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 1:
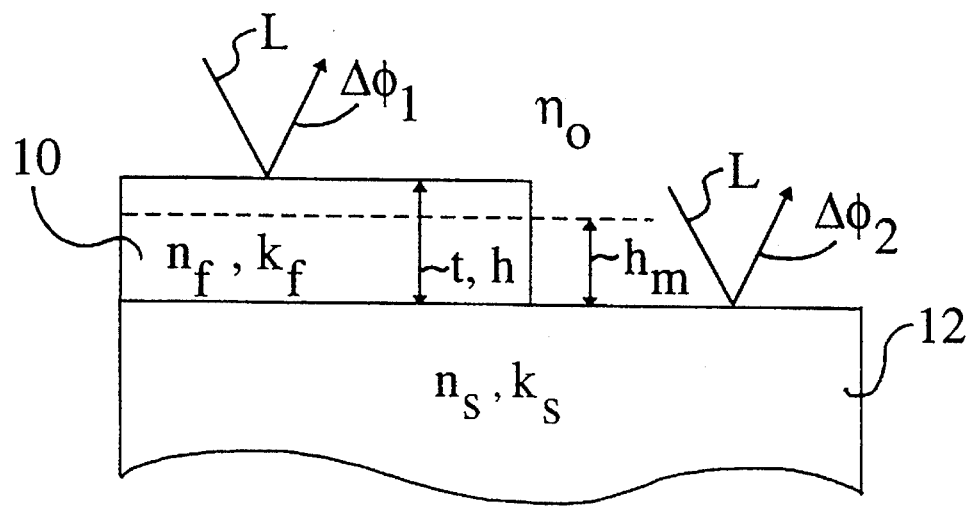
FIG. 1 is a simplified schematic representation of a normal incident beam on a uniform thin film overlaying a bare substrate sample.
Figure 4:
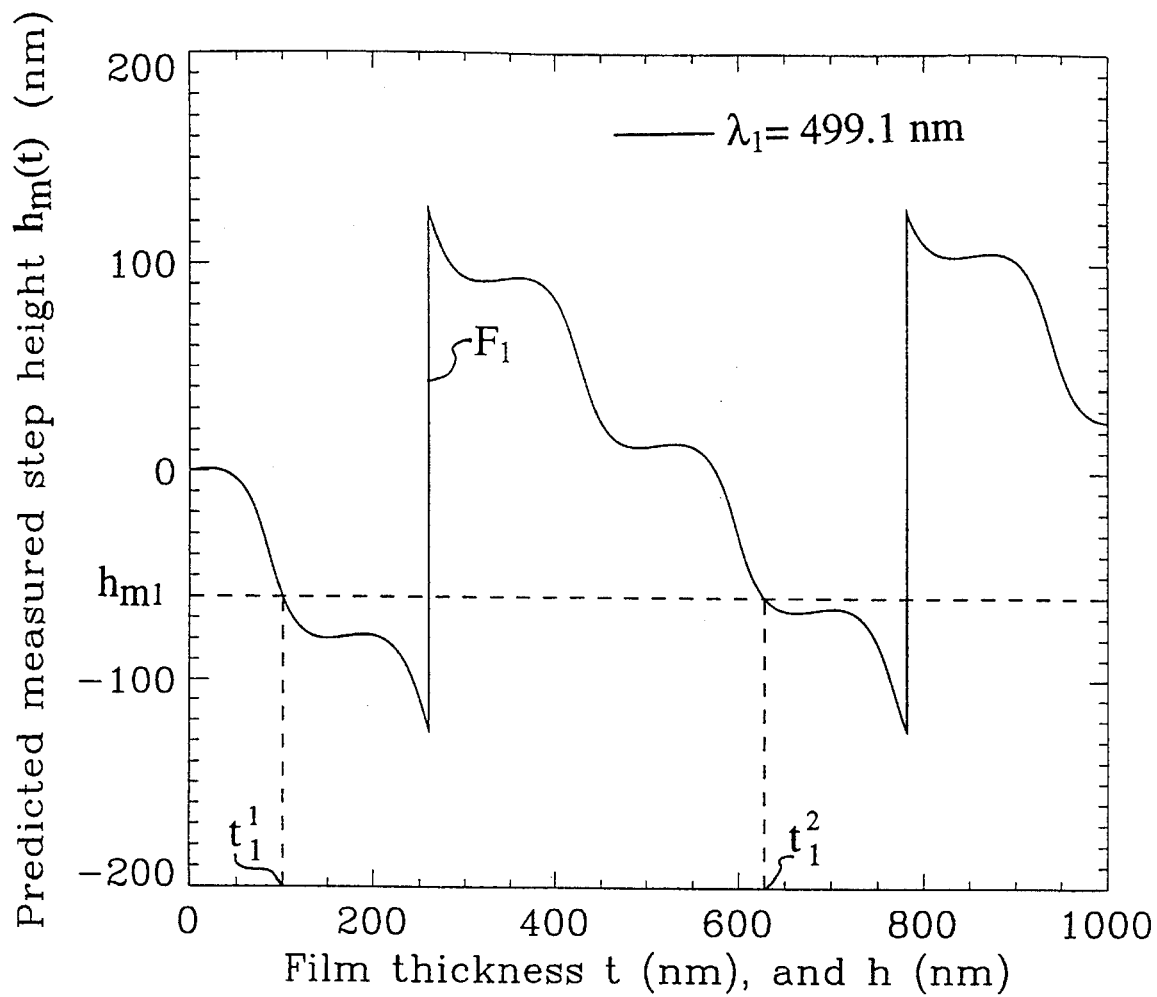
FIG. 4 is a plot of measured heights calculated theoretically from Equation 5 as a function of true heights for a test sample consisting of a $SiO_2$ film over a silicon substrate, as illustrated in the model of FIG. 1, using a wavelength λ=499.1 nm; multiple true heights (100 and 628 nm) are shown that correspond to the measured height (−60 nm) determined by phase-shifting interferometry at that wavelength.

On the basis of the thin-film theory outlined above, it is clear that the offset between a test-sample's physical step height and the height produced by phase-shifting measurements is a definite quantity determined by a precise relationship that depends on the type of materials constituting the film and the substrate, the thickness of the film, the nature of the step (that is, whether it results from a non-uniformity in the film, the thickness of the film, or the film and a non-uniformity in the substrate), and the wavelength used during measurement. One aspect of this invention is based on the idea of pre-calculating the theoretical measured step height as a function of the true step height in such a test surface, thereby producing a map of measured heights as a function of true heights. In particular, such map will necessarily also contain the set of true heights that correspond to a given measured height. As those skilled in the art readily understand, because of the periodic nature of the phase of light, a true-height versus measured-height plot derived from Equation 4 ($h_m$ vs. h) produces multiple solutions, whereby an ambiguity results that prevents the direct determination of h from a plot of $h_m$ versus h. FIG. 4 illustrates a typical curve $F_1$ produced by Equation 5; the curve corresponds to a test sample consisting of a $SiO_2$ film over a silicon substrate, as illustrated in the model of FIG. 1, using a predetermined wavelength λ=499.1 nm. The figure shows, for example, that a measured height $h_{m1}$ of −60 nm (wherein the value is measured with respect to the substrate surface set at h=0) could correspond to a true height $t_1^1$ of about 100 nm or $t_1^2$ of about 628 nm. Note that a negative sign for the measured height is due to different phase changes upon reflection from different portions of the sample. Therefore, not only an analytical solution of Equation 5 is not directly possible because of its implicit functionality, as mentioned above, but a direct numerical or graphical solution is not possible as well because of the phase ambiguity that is inherent with phase-shifting techniques and produces multiple solutions.

Figure 5:
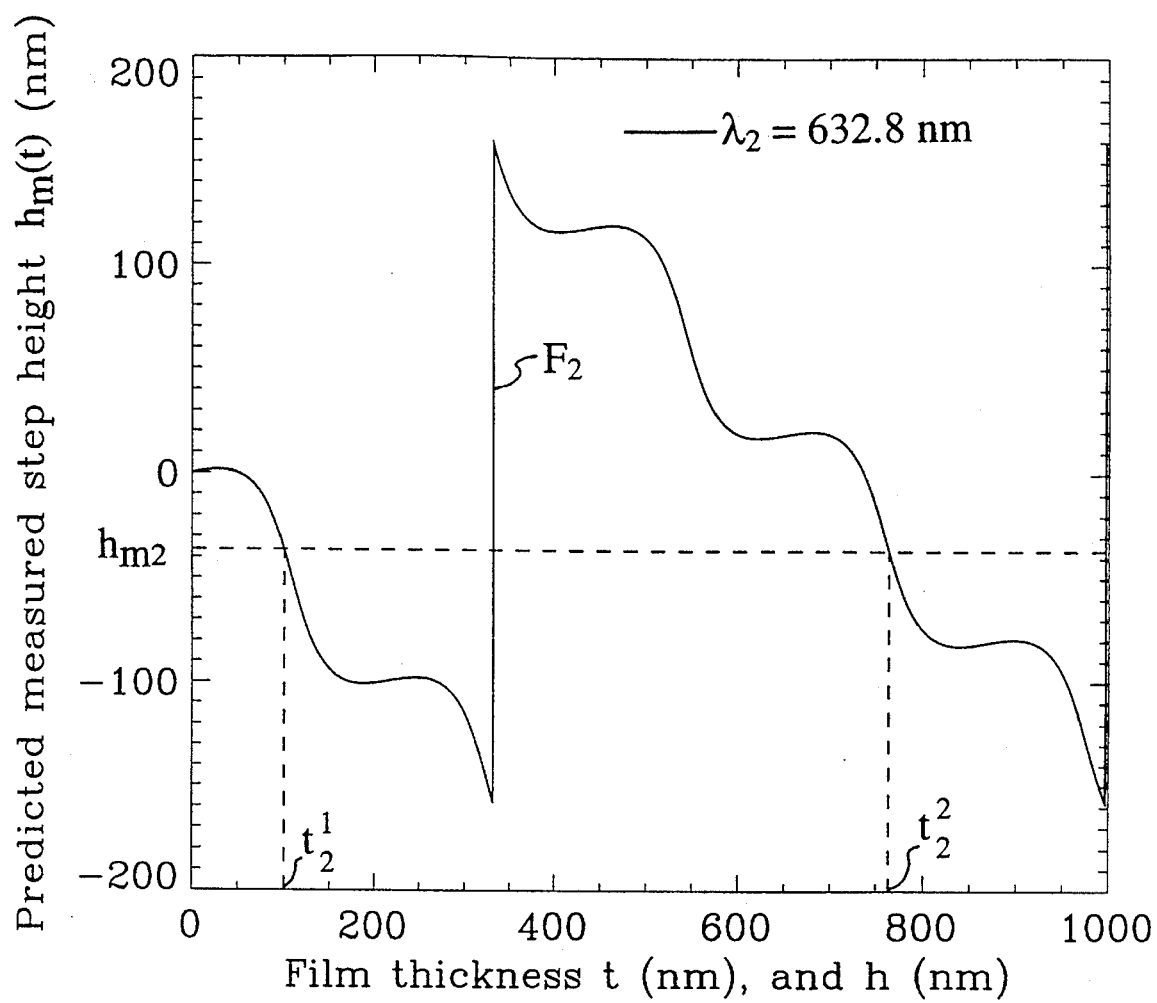
FIG. 5 is a plot of measured heights calculated theoretically from Equation 5 as a function of true heights for the test sample of FIG. 4 using a wavelength λ=632.8 nm; multiple true heights (100 and 763 nm) are shown that correspond to the measured height (−36 nm) determined by phase-shifting interferometry at that wavelength.
Figure 6:
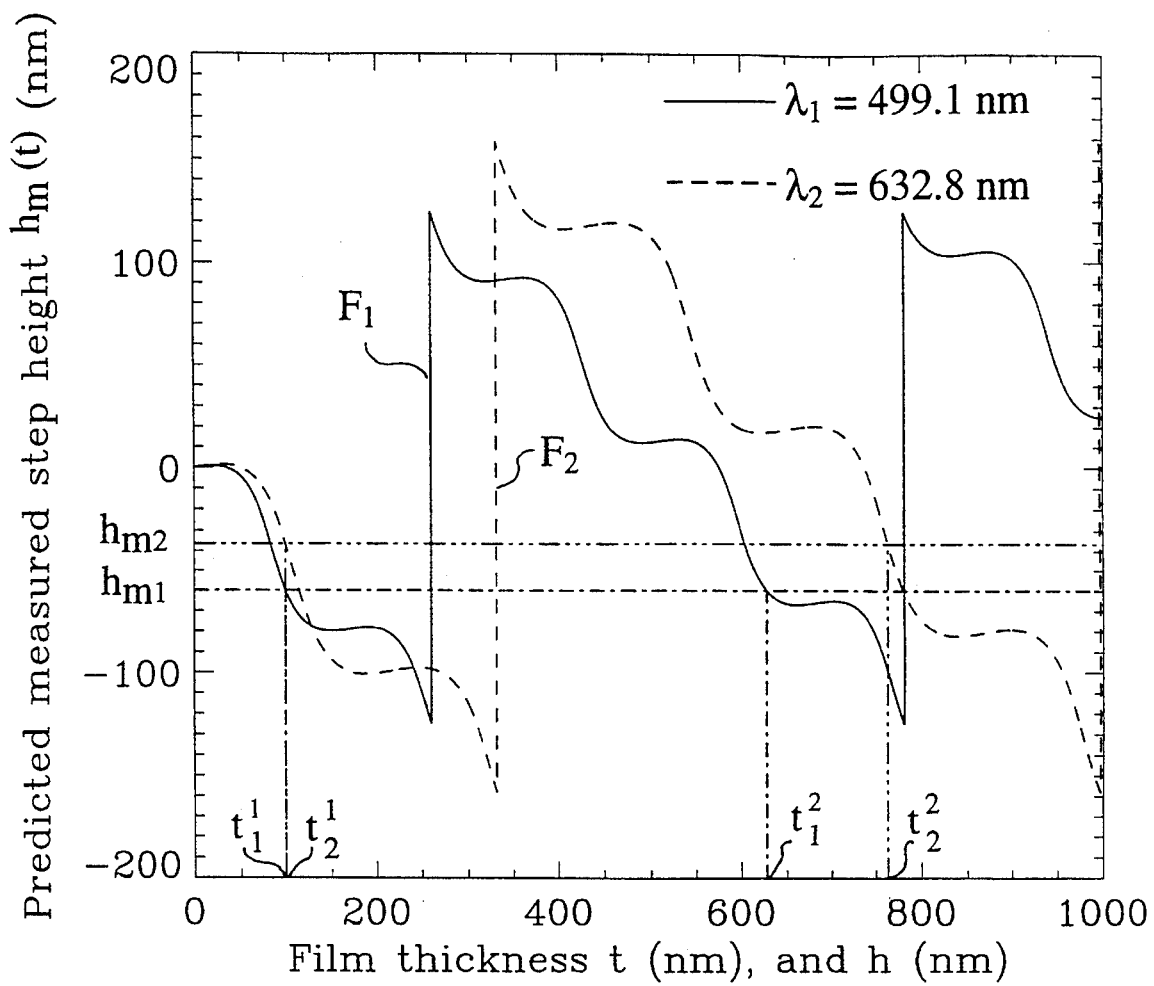
FIG. 6 is a combination of the plots of FIGS. 4 and 5 to illustrate the single true-height value that corresponds to both measured heights shown in those figures.

Another aspect of the present invention is the realization that repeating the height measurement and plotting Equation 5 at a different wavelength would, respectively, produce a different measured height $h_{m2}$ and a different $h_m$ vs. h plot, but a single true height would necessarily correspond to both measured heights. For example, repeating the height measurement for the sample of FIG. 4 at λ=632.8 nm produced a measured height $h_{m2}$ of about −36 nm. FIG. 5 is a plot $F_2$ of Equation 5 for the same sample corresponding to λ=632.8 nm. This plot shows that two true-height values, $t_2^1$ and $t_2^2$, correspond to the measured height of −36 nm: that is, approximately 100 nm and 763 nm. Therefore, since h=100 nm is the only true-height value capable of producing the heights (−60 nm and −36 nm) measured at the chosen wavelengths, it must represent the single, correct true-height value. Note that negative heights and their absolute values are used interchangeably here because the latter is the quantity of interest, while the former is a relative quantity obtained by measurement. A graphical solution for determining h can also be obtained simply by overlapping the two plots of FIGS. 4 and 5 (which must obviously be drawn on the same scale) and searching for the single value of h (and t) that corresponds to both measured values for $h_m$. Such a composite plot is illustrated in FIG. 6. Alternatively, the solution can be obtained numerically by comparing the two curves $F_1$ and $F_2$ and finding the single common height corresponding to the measured heights at the two measurement wavelengths.

Figure 7:
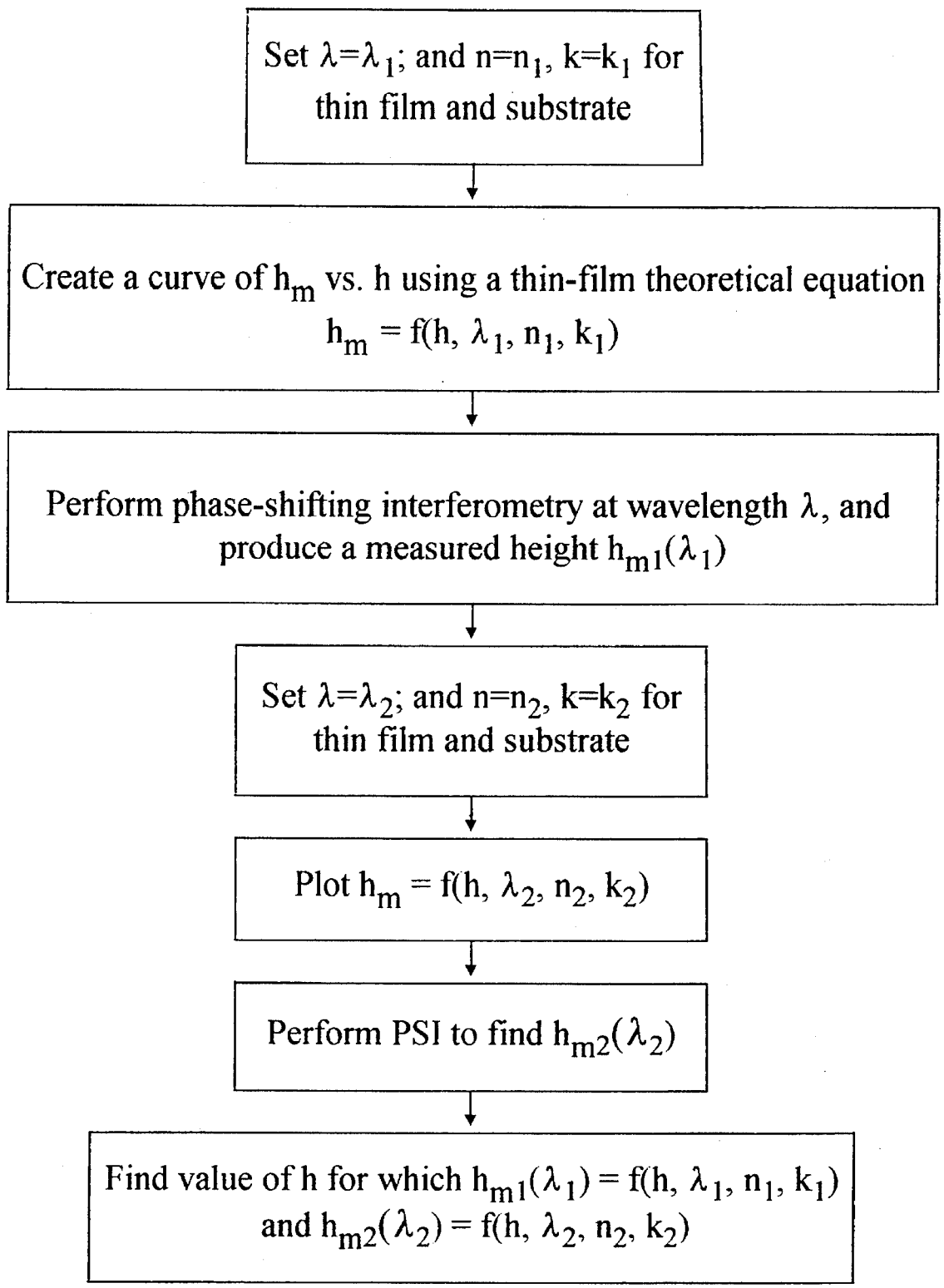
FIG. 7 is a schematic diagram of the procedure of this invention for a test sample consisting of a thin film overlaying a uniform substrate.

This procedure for measuring the step height in a test sample consisting of a thin film over a uniform substrate is outlined in the flow diagram of FIG. 7. Note that the steps of generating a theoretical plot of $h_m$ versus h and of producing a height measurement by phase-shifting interferometry may be performed equivalently in any order for the purposes of this invention. Therefore, the order shown in FIG. 7 may be reversed without affecting the substance of the procedure. Note also that the film thickness t and the step height h are the same for this case, as mentioned, and are so reflected in the applicable figures and equations.

Figure 2:
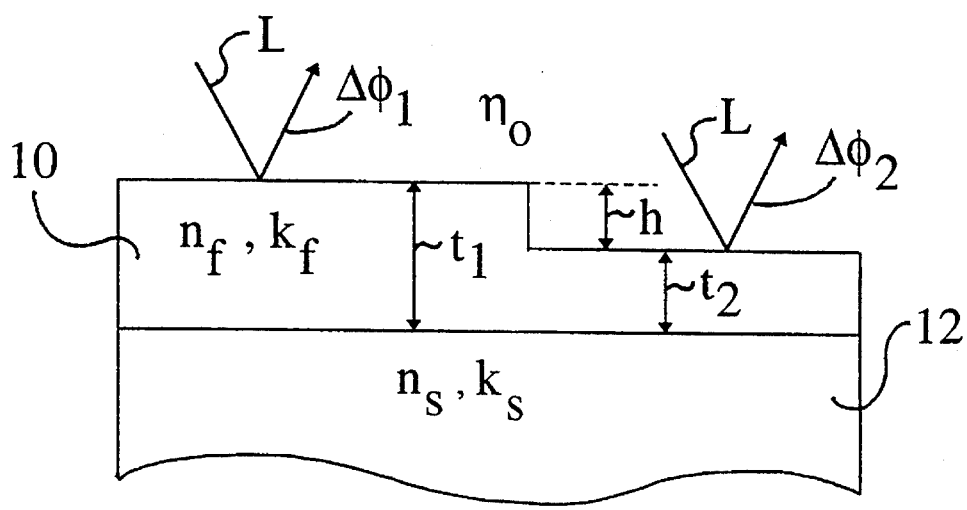
FIG. 2 is a simplified schematic representation of a normal incident beam on a non-uniform thin-film over a uniform substrate sample.
Figure 8A:
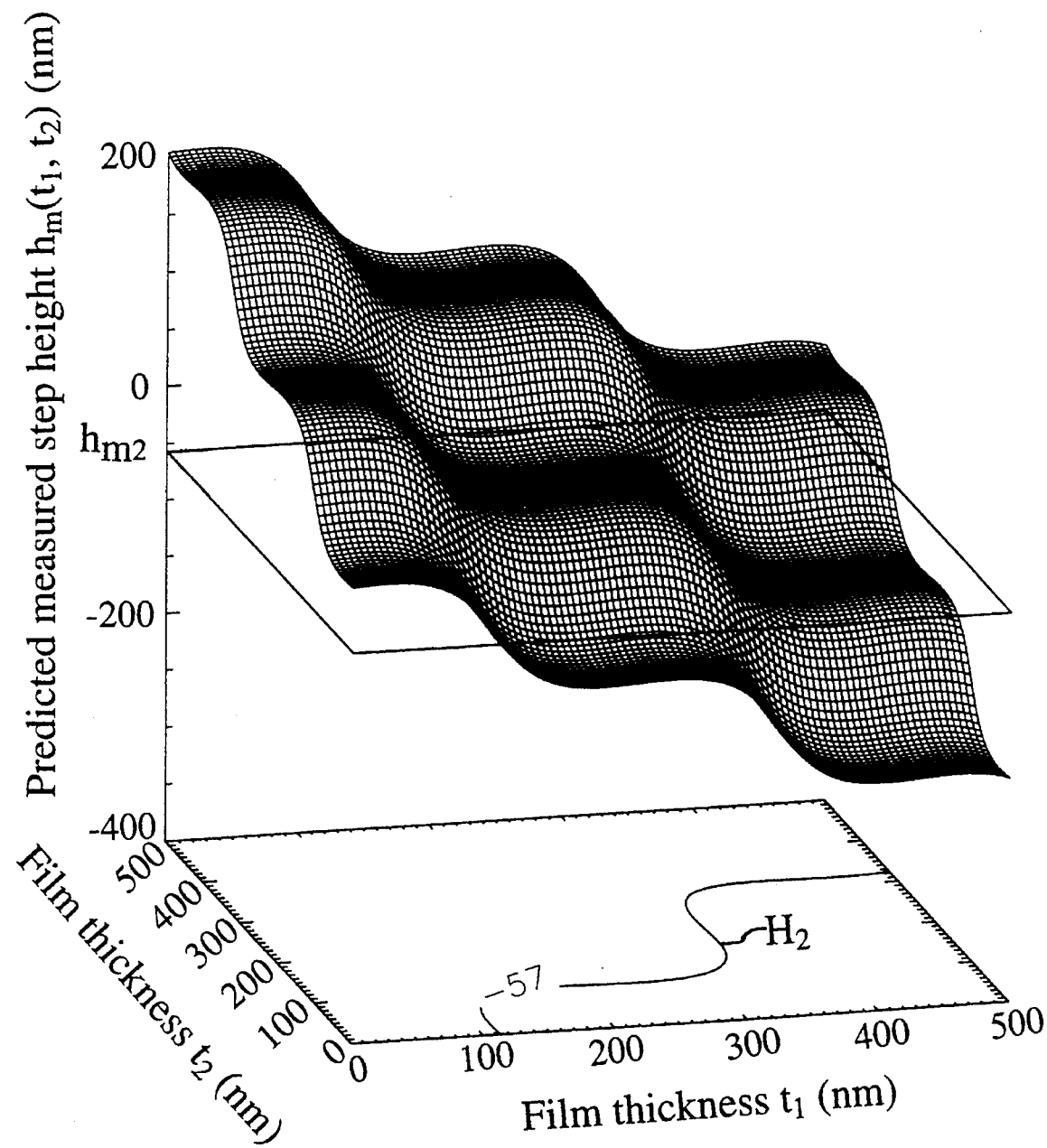
FIG. 8a is a three-dimensional map of $h_m$ as a function of both $t_1$ and $t_2$, the thickness of the $SiO_2$ thin film in two regions separated by a step of height h.
Figure 8B:
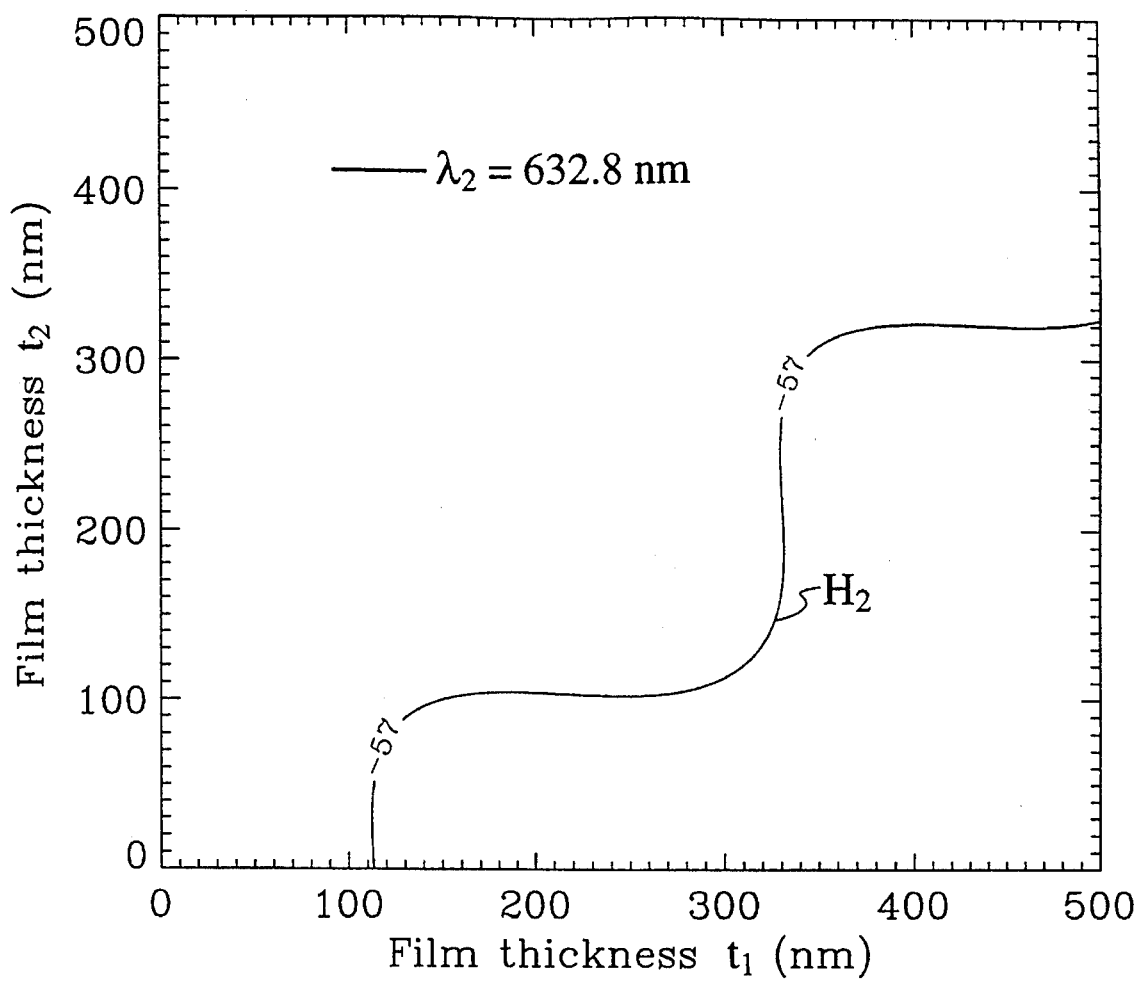
FIG. 8b is a map of the intersection of the three-dimensional map of FIG. 8a with a plane passing through it at the measured height of −57 nm.

Referring to the model illustrated in FIG. 2, which represents a non-uniform homogeneous film overlaying a uniform substrate, it is clear that the theoretical equation describing the functional relationship between h and $h_m$ at a given wavelength can be obtained from the general relation of Equation (4) by calculating both $\Delta\phi_1$ and $\Delta\phi_2$ according to Equation 3, which yields $$h_m(\lambda) = h + \frac{\lambda}{4\pi} [\Delta\phi_1(\lambda,t_1) - \Delta\phi_2(\lambda,t_2)], \qquad (6)$$

where h is the true step height between regions 1 and 2 of the thin film and $t_1$ and $t_2$ represent the thickness of the film in those two regions, respectively. Note that $t_1=t_2+h$; therefore, h can be expressed in terms of $t_1$ and $t_2$ ($h=t_1-t_2$) and Equation 6 can be plotted as a three-dimensional map of $h_m$ as a function of both $t_1$ and $t_2$, as illustrated in FIG. 8a. The intersection between such three-dimensional map and a plane corresponding to a predetermined measured height $h_m$ consists of a continuous isometric curve comprising the loci of the points corresponding to all $t_1/t_2$ combinations that produce that value of $h_m$ using Equation 6. An example of such a curve $H_2$ corresponding to a measured height $h_m=-57$ nm is shown in FIGS. 8a and 8b for a sample consisting of a stepped $SiO_2$-film surface over a silicon substrate (the model of FIG. 2). Phase-shifting measurements at wavelength λ=632.8 nm produced a measured height $h_m=-57$ nm, to which the curve $H_2$ corresponds.

Figure 9:
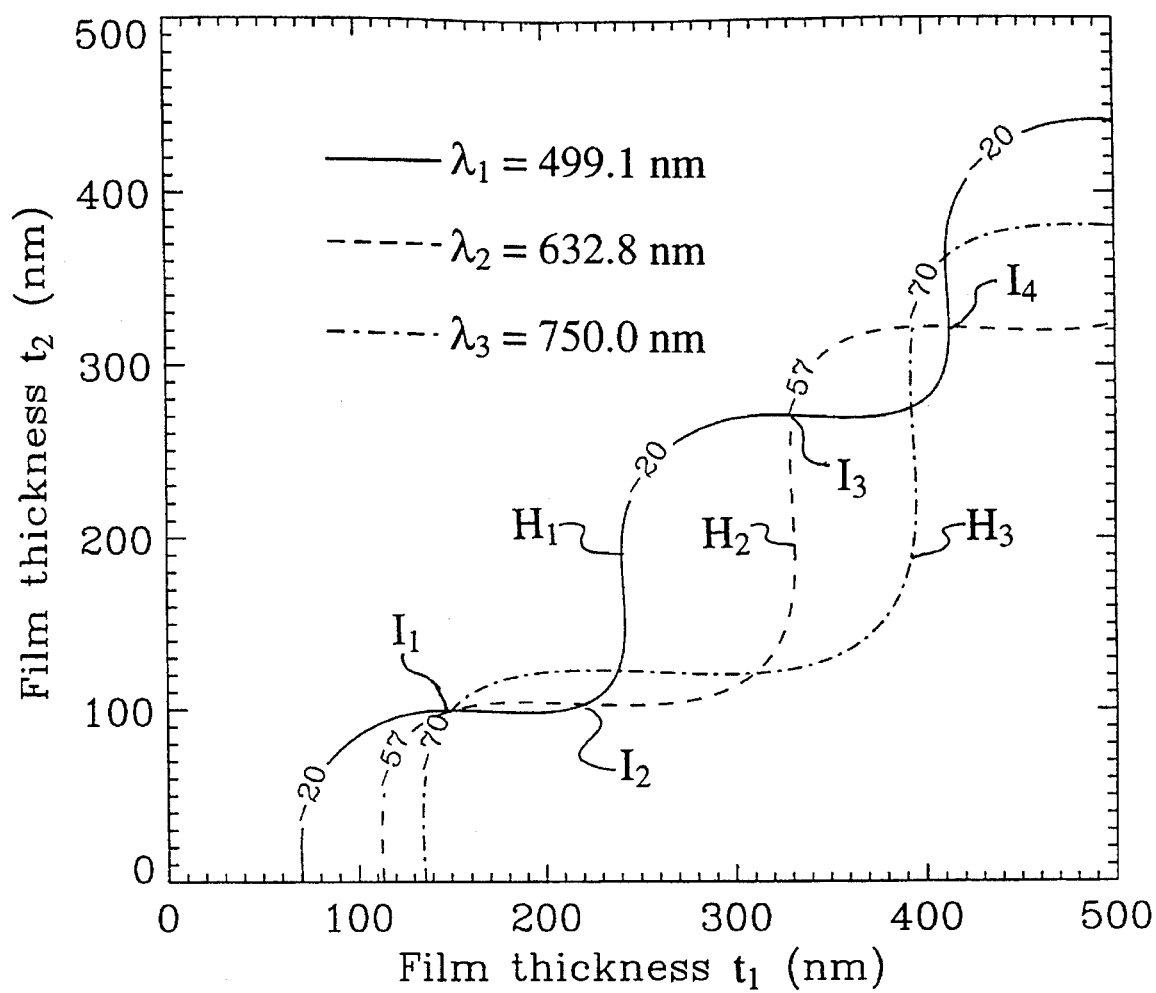
FIG. 9 is a plot of three isometric curves of sets of $t_1/t_2$ values that produce theoretical measured heights equal to the measured heights of 20, 57, and 70 nm (in absolute value) generated by PSI at wavelengths of 499.1, 632.8 and 750.0 nm, respectively; each of these plots corresponds to the intersection of the three-dimensional map of FIG. 8a with a plane passing through it at a given measured height.

Repeating the procedure at wavelength λ=499.1 nm, a different measured height ($h_m=-20$ nm) is produced by phase-shifting interferometric measurements and a different curve $H_1$ is produced by Equation b 6. As seen in FIG. 9, the two curves $H_1$ and $H_2$ intersect at points $I_1$, $I_2$, $I_3$ and $I_4$, which all satisfy Equation 6; therefore, one of these points corresponds to the true values of $t_1$ and $t_2$ that produce the measured heights of 20 and 57 nm at $\lambda$=499.1 and 632.8 nm, respectively.

Figure 10:
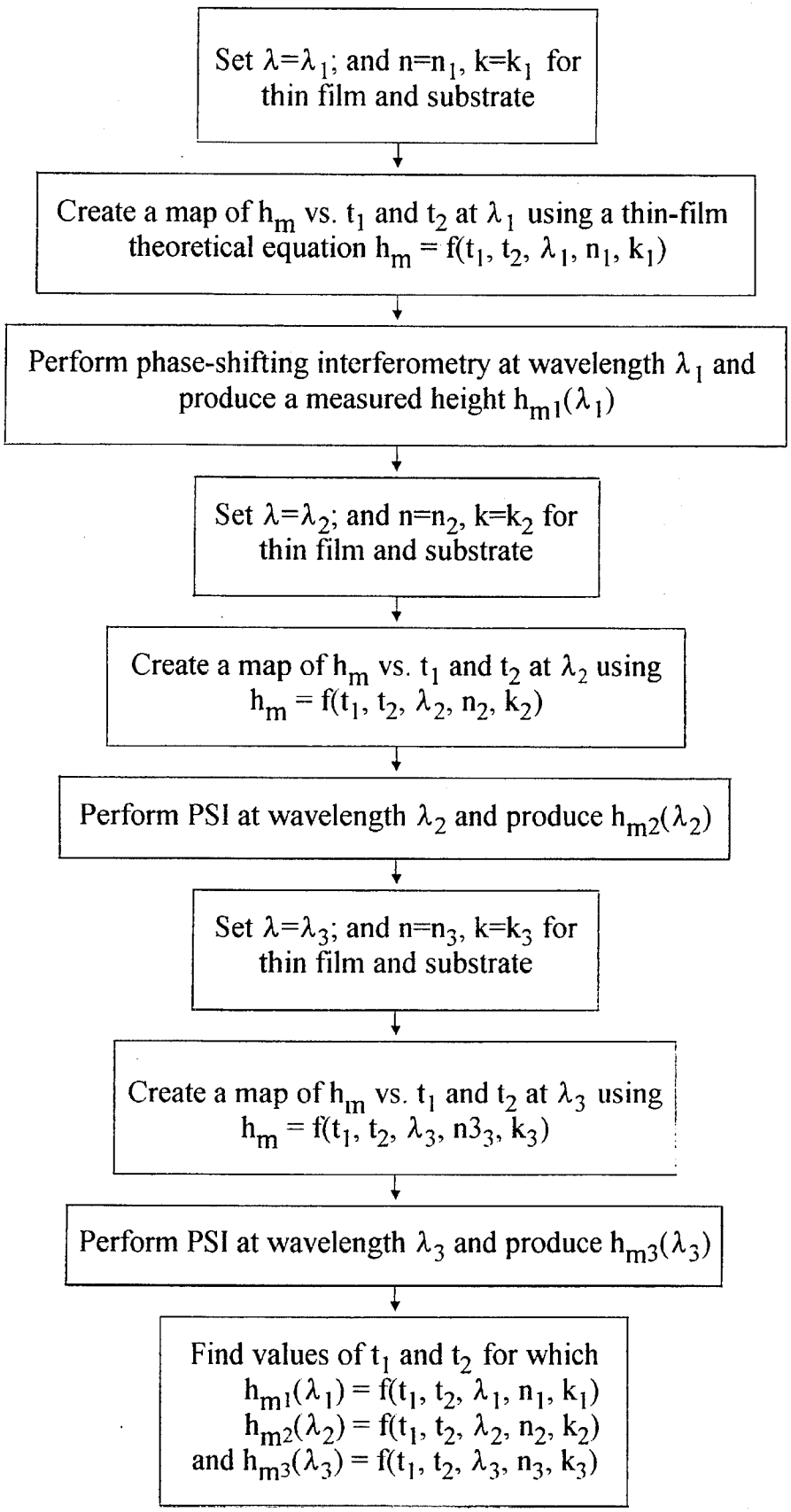
FIG. 10 is a schematic diagram of the procedure of this invention for a test sample consisting of a thin film of variable thickness overlaying a uniform substrate.

In order to solve the ambiguity concerning which one of points $I_1$–$I_4$ corresponds to the single true solution, the procedure is repeated at yet another wavelength, thereby providing a third curve $H_3$ that can be used to isolate the solution. Continuing with the example of FIGS. 2 and 9, repeating the procedure at wavelength $\lambda$=750.0 nm yields a measured height of −70 nm and a curve $H_3$ which, when combined with $H_1$ and $H_2$, identifies the single point $I_1$ where all three curves coincide. As one skilled in the art would readily understand, that point corresponds to the single value of h that satisfies Equation 6 for $h_m$=−20, −57 and −70 nm, which in turn correspond to measurements derived at wavelengths $\lambda$=499.1, 632.8 and 750.0 nm, respectively. Thus, the curves plotted on FIG. 9 show that $t_1$ and $t_2$ corresponding to the true step height are approximately 150 and 100 nm, respectively, from which it is determined that h=150−100=50 nm. The steps of this procedure are illustrated in FIG. 10.

Figure 3:
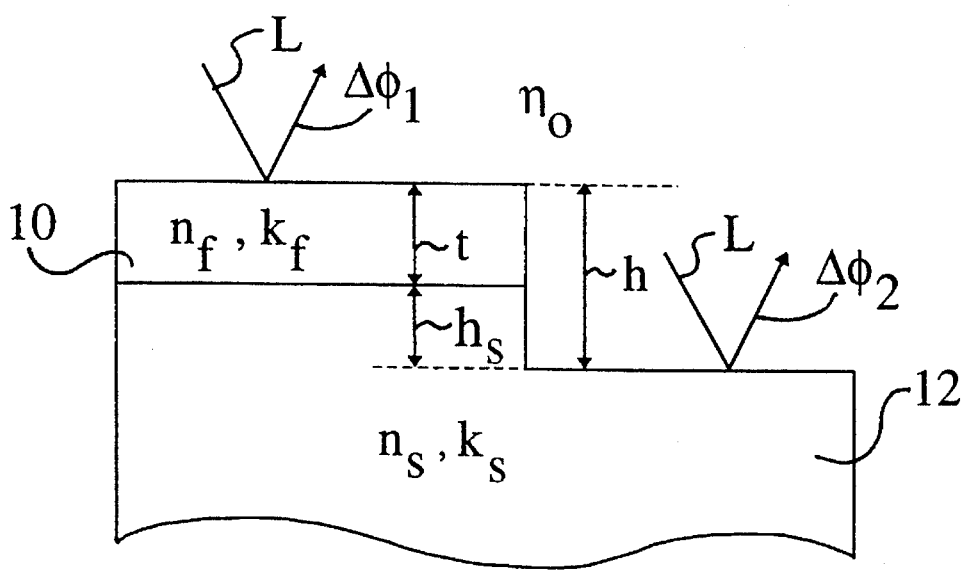
FIG. 3 is a simplified schematic representation of a normal incident beam on a uniform thin-film over a stepped substrate sample.

Referring now to the model of FIG. 3, concerning a thin film 10 of thickness t over a substrate 12 having a step or riser of thickness ha so that an overall surface step of height h is produced, the procedure of the invention can be applied as well to determine h from measured phase-shifting data. The theoretical equation describing the functional relationship between h and $h_m$ at a given wavelength is obtained again from the general relation of Equation 4 by calculating $\Delta\phi_1$ according to Equation 3 and $\Delta\phi_2$ according to Equation 2, which yields $$h_m(\lambda) = h + \frac{\lambda}{4\pi} [\Delta\phi_1(\lambda,t) - \Delta\phi_2(\lambda,h_s)], \qquad (7)$$

where h is the true step height between region 1 of the thin film and region 2 of the substrate, and t and $h_s$ a represent the thickness of the film and the step height of the substrate, respectively. Note that $t+h_s=h$; therefore, $h_s$ can be expressed in terms of t and h and Equation 7 can be plotted as a three-dimensional map of $h_m$ as a function of both t and $h_s$, two independent variables as in the case illustrated in FIGS. 8a and 8b. Three three-dimensional maps of $h_m$ as a function of t and $h_s$ at three different wavelengths are generated from Equation 7. Then, three measured heights h. are produced by phase-shifting interferometry at those wavelengths and are used to generate an isometric curve for each measured height from the three-dimensional maps. Finally, the point of common intersection for all three isometric curves corresponds to the true values of t and $h_s$ that produced the results measured by PSI.

One skilled in the art would readily understand that if t or $h_s$ is known the model of FIG. 3 is reduced to one where a single dimension is unknown, whereby the model of FIG. 1 and Equation 5 may be used to find the solution. If t is known, for example, $h_m$ is plotted as a function of h or $h_s$ (only one of them remains as an independent variable) at two different wavelengths and two curves are generated of the type shown in FIG. 6. Phase-shifting interferometry is then carried out at the same two wavelengths, thereby producing two $h_m$ values. The single value of h that satisfies both curves at the measured values of $h_m$ is the true height of the step.

As illustrated by the foregoing, the method of the present invention consists of a numerical or graphical approach for determining film thickness variations or the true step height of a thin-film/substrate sample when phase-shifting measurements and the physical properties of the materials are available. The number of phase-shifting measurements and plots of Equation 4 required to solve a specific problem will depend on how many parameters are unknown in the system $(t, t_1, t_2, h_s)$, which in turn depends on the particular physical configuration of the test sample. Irrespective of the particular structure of the sample and the corresponding model adopted for finding one or more unknown parameters, the procedure of the invention is the same. First, a plot of the theoretical measured height $h_m$ is generated using Equation 4 as a function of the unknown parameters at a predetermined wavelength. Appropriate functional relations are used (such as Equations 2 or 3) to express the theoretical phase change at the interface between air and the medium from which the light is reflected. Note that other theoretical relations would be equivalently suitable for practicing the invention. Second, a value for $h_m$ is generated by phase-shifting interferometry at that wavelength. Third, all true-height values corresponding to $h_m$ are identified on the plot. These steps are then repeated at different predetermined wavelengths sufficient times to generate a number of curves greater than the number of unknown parameters in the system. For example, if one parameter is unknown, at least two curves are generated; if two parameters are unknown, at least three are required. Finally, the single true-height value that is identified as a common solution in all curves is chosen to be the true value of the step height in the sample. As noted above, the order in which these steps are performed is not critical, so long as the necessary number of curves and PSI measurements are procured.

Various changes in the details, steps and components that have been described may be made by those skilled in the art within the principles and scope of the invention herein illustrated and defined in the appended claims. For example, all steps of the invention have been described in terms of operations that can be performed graphically and manually, but the procedure would preferably be implemented by utilizing a microprocessor and conventional search and contour mapping software in conjunction with existing phase-shifting interferometric apparatus. Based on the same principles, the technique of the invention can be applied to the measurement of more complex samples such as those consisting of multiple film layers, or those having a non-uniform thickness across the film region, as well as nonuniform substrates. In particular, a 3-dimensional profile of the patterned film surface can be constructed by measuring the film thickness variation point by point across the entire measurement field.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method for measuring by phase-shifting interferometry the height of a step between an optically-thin film and an opaque substrate in a test sample having known optical parameters at predetermined wavelengths, comprising the following steps:

(a) creating a first curve of a theoretical measured-height versus a physical height of said step between said optically-thin film and opaque substrate in the test sample as a function of said optical parameters at a first predetermined wavelength; and performing phase-shifting interferometry on the test sample to produce a first experimental measured-height of the step between the optically-thin film and the opaque substrate;

(b) repeating step (a) at a second predetermined wavelength, thereby producing a second curve and a second experimental measured-height; and (c) comparing said first and second curves to determine a single physical height on the curves that corresponds to said first experimental measured-height on the first curve and to said second experimental measured-height on the second curve.

2. The method of claim 1, wherein said known optical parameters comprise refraction indices and extinction coefficients of the thin film and substrate; and wherein said curves of a theoretical measured-height versus physical height of said step are generated by mapping the following equation:

$$h_m(\lambda) = h + \frac{\lambda}{4\pi} [\Delta\phi_1(\lambda,h) - \Delta\phi_2(\lambda)],$$

wherein $h_m(\lambda)$ is the theoretical measured-height of the step;

h is the physical height of the step; and $$\Delta\phi_1(\lambda,h) = \arctan\left(\frac{-2b\eta_o}{\eta_o^2 - a^2 - b^2}\right),$$

where $\eta_o$ is the admittance of air, and a and b are real and imaginary components, respectively, of an admittance of an assembly consisting of the thin film and the substrate at said predetermined wavelengths and thickness of the thin film; and $$\Delta\phi_2(\lambda) = \arctan\left(\frac{2k_s}{1 - n_s^2 - k_s^2}\right),$$

where $n_s$ and $k_s$ are the refraction index and the extinction coefficient of the substrate, respectively, at said predetermined wavelengths.

3. The method of claim 1, wherein said curves are generated by a microprocessor and said step (c) is performed by search and contour mapping software.

4. The method of claim 2, wherein said curves are generated by a microprocessor and said step (c) is performed by search and contour mapping software.

5. A method for measuring by phase-shifting interferometry the height of a step or profile variation between a first and a second region of an optically-thin film overlaying an opaque substrate in a test sample having known optical parameters at predetermined wavelengths, wherein said thin film has a first thickness in the first region and a second thickness in the second region, the method comprising the following steps:

(a) creating a first three-dimensional map of a theoretical measured-height as a function of said first and second thicknesses of the optically-thin film in the test sample and as a function of said optical parameters at a first predetermined wavelength; performing phase-shifting interferometry on the test sample to produce a first experimental measured-height of the step between the two regions of the optically-thin film; and finding all points on said first three-dimensional map corresponding to the first experimental measured-height, thereby generating a first isometric plot of the first and second thicknesses of the optically-thin film;

(b) repeating step (a) at a second predetermined wavelength, thereby producing a second three-dimensional map, a second experimental measured-height, and a second isometric plot;

(c) repeating step (a) at a third predetermined wavelength, thereby producing a third three-dimensional map, a third experimental measured-height, and a third isometric plot; and (d) comparing said first, second and third isometric plots to determine a single set of said first and second thicknesses that corresponds to said first experimental measured-height of the first isometric plot, to said second experimental measured-height of the second isometric plot, and to said third experimental measured-height of the third isometric plot.

6. The method of claim 5, wherein said known optical parameters comprise refraction indices and extinction coefficients of the thin film and substrate; and wherein said three-dimensional maps of a theoretical measured-height as a function of said first and second thicknesses of the optically-thin film in the test sample are generated by mapping the following equation:

$$h_m(\lambda) = (t_1 - t_2) + \frac{\lambda}{4\pi} [\Delta\phi_1(\lambda,t_1) - \Delta\phi_2(\lambda,t_2)],$$

wherein $h_m(\lambda)$ is the theoretical measured-height;

$t_1$ and $t_2$ are the first and second thickness of the optically-thin film, respectively;

$$\Delta\phi_1(\lambda,t_1) = \arctan\left(\frac{-2b\eta_o}{\eta_o^2 - a^2 - b^2}\right); \text{ and}$$

$$\Delta\phi_2(\lambda,t_2) = \arctan\left(\frac{-2b\eta_o}{\eta_o^2 - a^2 - b^2}\right),$$

where $\eta_o$ is the admittance of air, and a and b are the real and imaginary components, respectively, of an admittance of an assembly consisting of the thin film and the substrate at said predetermined wavelengths and first and second thicknesses.

7. The method of claim 5, wherein said three-dimensional maps and said isometric plots are generated by a microprocessor and said step (d) is performed by search and contour mapping software.

8. The method of claim 6, wherein said three-dimensional maps and said isometric plots are generated by a microprocessor and said step (d) is performed by search and contour mapping software.

9. A method for measuring by phase-shifting interferometry the height of a step between a first region of an optically-thin film overlaying an opaque substrate and a second region of said substrate in a test sample having known optical parameters at predetermined wavelengths, wherein said step consists of a thin-film thickness and a substrate-riser thickness, the method comprising the following steps:

(a) creating a first three-dimensional map of a theoretical measured-height as a function of said thin-film thickness and said substrate-riser thickness of the test sample and as a function of said optical parameters at a first predetermined wavelength; performing phase-shifting interferometry on the test sample to produce a first experimental measured-height of the step between said two regions; and finding all points on said first three-dimensional map corresponding to the first experimental measured-height, thereby generating a first isometric plot of said thin-film thickness and substrate-riser thickness;

(b) repeating step (a) at a second predetermined wavelength, thereby producing a second three-dimensional map, a second experimental measured-height, and a second isometric plot;

(c) repeating step (a) at a third predetermined wavelength, thereby producing a third three-dimensional map, a third experimental measured-height, and a third isometric plot; and (d) comparing said first, second and third isometric plots to determine a single set of said thin-film thickness and substrate-riser thickness that corresponds to said first experimental measured-height of the first isometric plot, to said second experimental measured-height of the second isometric plot, and to said third experimental measured-height of the third isometric plot.

10. The method of claim 9, wherein said known optical parameters comprise refraction indices and extinction coefficients of the thin film and substrate: and wherein said three-dimensional maps of a theoretical measured-height as a function of said thin-film thickness and substrate-riser thickness in the test sample are generated by mapping the following equation:

$$h_m(\lambda) = (t + h_s) + \frac{\lambda}{4\pi} [\Delta\phi_1(\lambda,t) - \Delta\phi_2(\lambda)],$$

wherein $h_m(\lambda)$ is the theoretical measured-height;

$t$ and $h_s$ are the thin-film thickness and the substrate-riser thickness, respectively;

$$\Delta\phi_1(\lambda,t) = \arctan\left(\frac{-2b\eta_o}{\eta_o^2 - a^2 - b^2}\right);$$

where $\eta_o$ is the admittance of air, and a and b are the real and imaginary components, respectively, of an admittance of an assembly consisting of the thin film and the substrate at said predetermined wavelengths and said thin-film thickness; and $$\Delta\phi_2(\lambda) = \arctan\left(\frac{2k_s}{1 - n_s^2 - k_s^2}\right),$$

where $n_s$ and $k_s$ are the refraction index and the extinction coefficient of the substrate, respectively, at said predetermined wavelengths.

11. The method of claim 9, wherein said three-dimensional maps and said isometric plots are generated by a microprocessor and said step (d) is performed by search and contour mapping software.

12. The method of claim 10, wherein said three-dimensional maps and said isometric plots are generated by a microprocessor and said step (d) is performed by search and contour mapping software.

* * * * *